US008582229B1

(12) United States Patent
Krishnan

(10) Patent No.: US 8,582,229 B1
(45) Date of Patent: Nov. 12, 2013

(54) PUSHPIN ASSEMBLY

(75) Inventor: Puspanathan Krishnan, Taman Klang Jaya (MY)

(73) Assignee: Western Digital Technologies, Inc., Irvine, CA (US)

(*) Notice: Subject to any disclaimer, the term of this patent is extended or adjusted under 35 U.S.C. 154(b) by 275 days.

(21) Appl. No.: 13/209,638

(22) Filed: Aug. 15, 2011

Related U.S. Application Data

(60) Provisional application No. 61/386,919, filed on Sep. 27, 2010.

(51) Int. Cl.
*G11B 21/02* (2006.01)

(52) U.S. Cl.
USPC .......................................................... 360/75

(58) Field of Classification Search
USPC .......................................................... 360/137
See application file for complete search history.

(56) References Cited

U.S. PATENT DOCUMENTS

| | | | |
|---|---|---|---|
| 5,774,294 A | 6/1998 | Fioravanti | |
| 5,796,542 A | 8/1998 | Szeremeta | |
| 6,147,831 A | 11/2000 | Kennedy et al. | |
| 6,867,949 B1 | 3/2005 | Guo et al. | |
| 6,914,405 B2 | 7/2005 | Bernard et al. | |
| 7,158,330 B2 * | 1/2007 | Morris et al. | 360/75 |
| 7,203,018 B1 * | 4/2007 | Kummli et al. | 360/75 |
| 7,633,706 B2 * | 12/2009 | Rigney | 360/78.04 |
| 7,667,919 B1 * | 2/2010 | Rigney et al. | 360/75 |
| 2005/0264927 A1 * | 12/2005 | Lai et al. | 360/98.08 |
| 2006/0221488 A1 * | 10/2006 | Morales et al. | 360/75 |
| 2007/0081268 A1 * | 4/2007 | Jung et al. | 360/73.01 |

\* cited by examiner

*Primary Examiner* — Mark Blouin

(57) ABSTRACT

A pushpin assembly for a spiral track writer is provided. The pushpin assembly includes a body, a bushing, and a pushpin. The body mounts on a pushpin arm of a spiral track writer. A cavity is defined in the body and extends between a first opening and a second opening of the body. The bushing slide fits within the cavity such that an inner wall of the cavity surrounds the bushing. The bushing surrounds a shaft portion of the pushpin. A tip portion of the pushpin extends through the first opening and engages an actuator arm of a headstack assembly of a hard disk drive for writing spiral tracks onto a media disk. A longitudinal force greater than or equal to a predetermined threshold exerted on the tip portion results in the bushing and the pushpin being displaced in a longitudinal direction relative to the body.

20 Claims, 9 Drawing Sheets

PUSHPIN ASSEMBLY

CROSS-REFERENCE TO RELATED APPLICATIONS

The present application claims priority from co-pending provisional U.S. Patent Application Ser. No. 61/386,919, filed on Sep. 27, 2010, the specification of which is incorporated herein by reference.

FIELD

The present invention generally relates to manufacturing and assembly equipment and, in particular, relates to pushpin assemblies for spiral track writers.

BACKGROUND

A spiral track writer may be used to write spiral tracks onto a media disk of a hard disk drive during manufacturing and assembly of the hard disk drive. However, during this writing process, the hard disk drive may be misaligned with respect to the spiral track writer. This misalignment may cause an undesirable force from the hard disk drive to be exerted onto a pushpin of the spiral track writer, causing damage to the spiral track writer. It is therefore advantageous to reduce or eliminate the damage caused to the spiral track writer as a result of the misalignment of the hard disk drive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In certain instances, well-known structures and techniques have not been shown in detail so as not to obscure the subject technology.

Figure 1A:
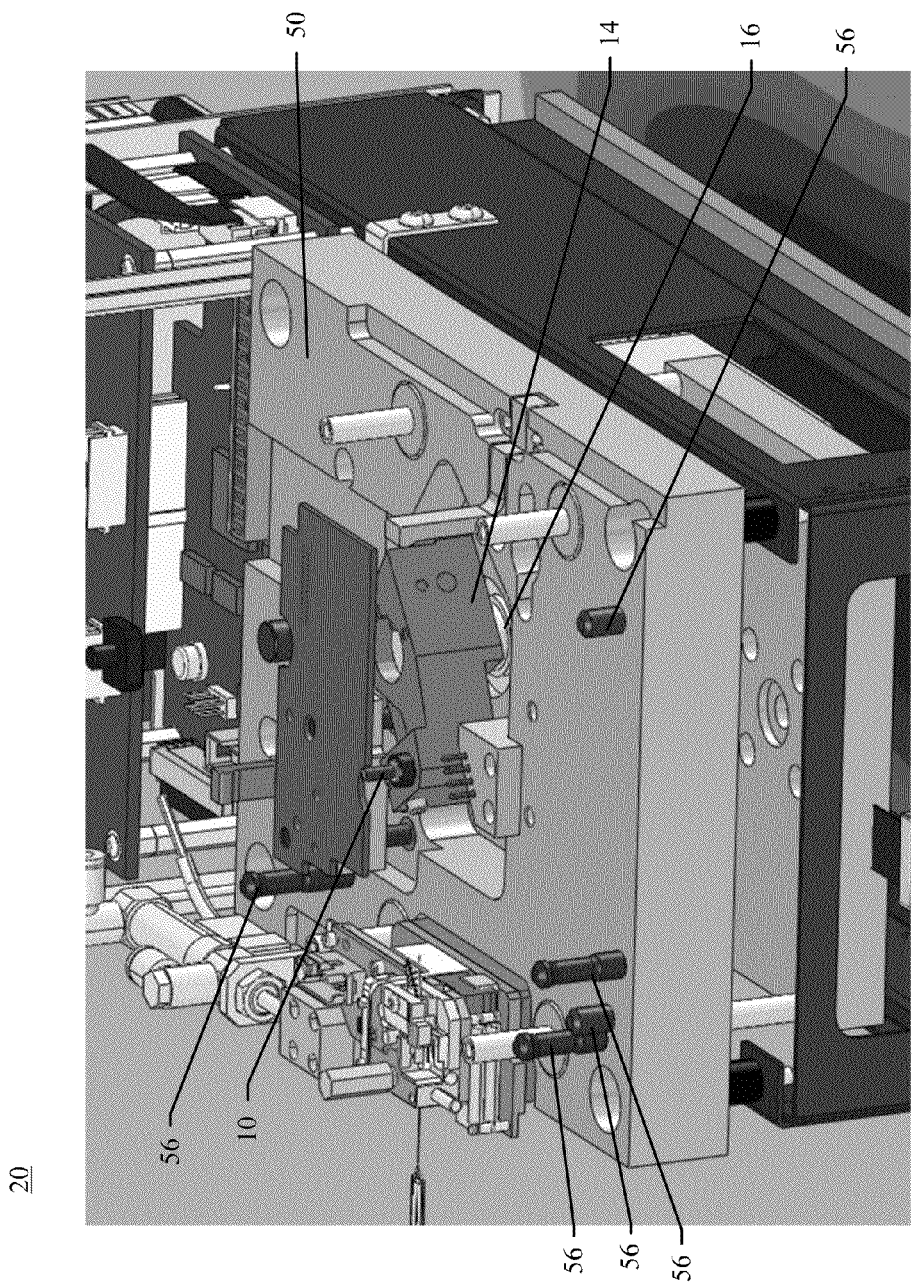
FIG. 1A illustrates a perspective view of a spiral track writer system, in accordance with various aspects of the subject technology.
Figure 1B:
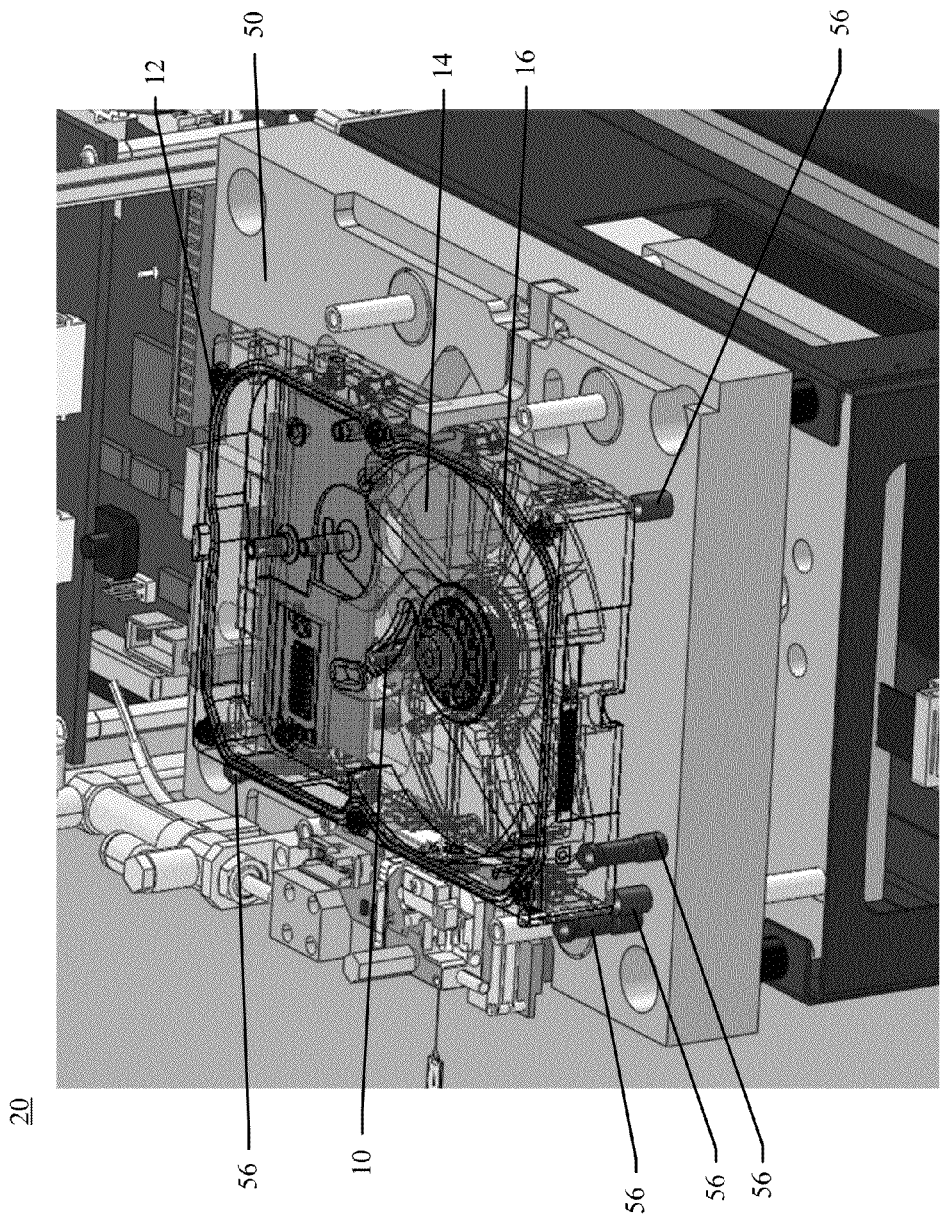
FIG. 1B illustrates a perspective view of a spiral track writer system with a hard disk drive positioned over a pushpin assembly and a pushpin arm, in accordance with various aspects of the subject technology.

A spiral track writer may be used to write spiral tracks onto a media disk of a hard disk drive during manufacturing and assembly of the hard disk drive. FIG. 1A illustrates a perspective view of spiral track writer system 20, in accordance with various aspects of the subject technology. Spiral track writer system 20 comprises actuator unit 50, shaft 16 attached to actuator unit 50, pushpin arm 14 mounted on shaft 16, and pushpin assembly 10 mounted on pushpin arm 14. In some aspects, spiral track writer system comprises one or more datum 56 used to position a hard disk drive over pushpin assembly 10 and pushpin arm 14. FIG. 1B illustrates a perspective view of spiral track writer system 20 with hard disk drive 12 positioned over pushpin assembly 10 and pushpin arm 14 using the one or more datum 56, in accordance with various aspects of the subject technology. In some aspects, actuator unit 50 is configured to actuate pushpin arm 14, and hence pushpin assembly 10, using shaft 16. Pushpin assembly 10 comprises a pushpin configured to engage an actuator arm of a headstack assembly of hard disk drive 12. Thus, spiral tracks may be written onto a media disk of hard disk drive 12 by actuating pushpin arm 14, causing the pushpin of pushpin assembly 10 to engage the actuator arm of the headstack assembly for writing the spiral tracks.

Figure 1C:
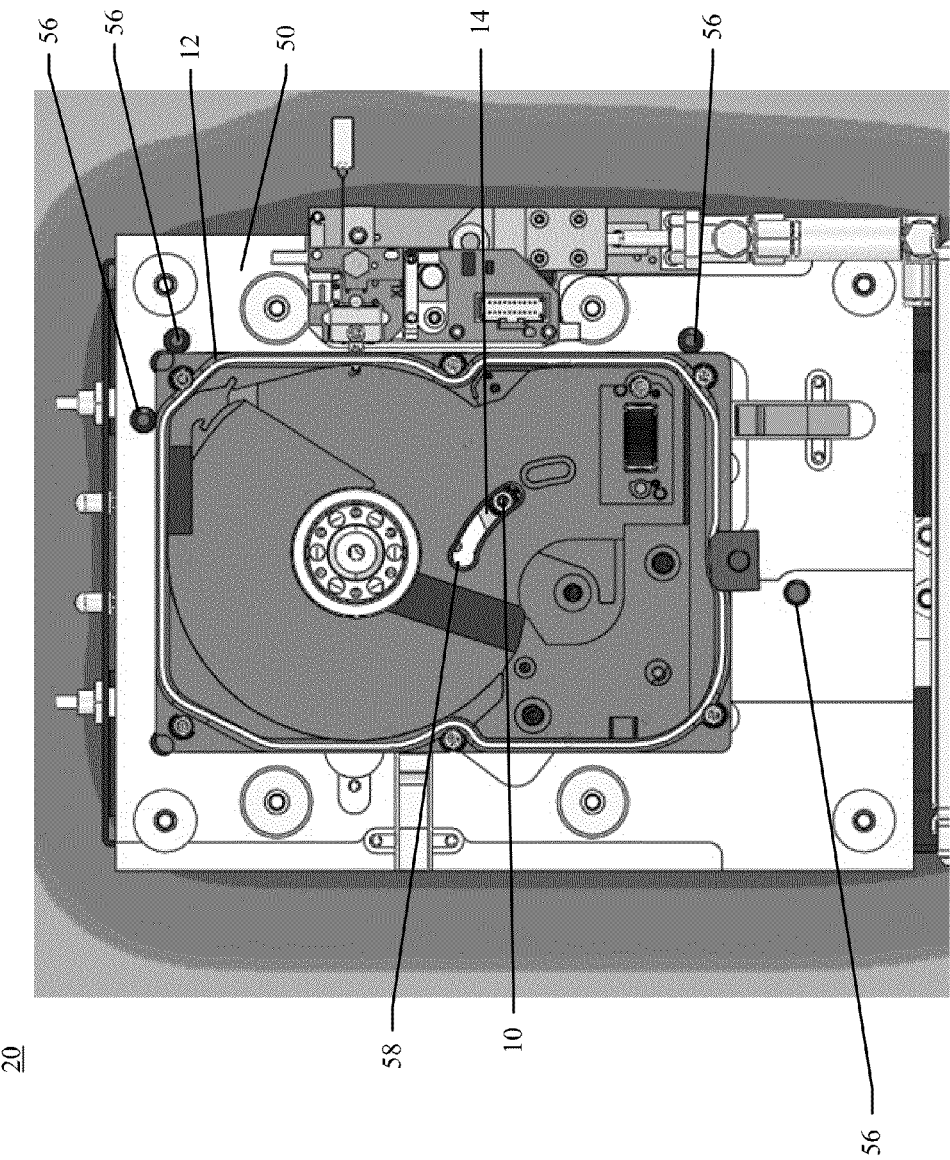
FIG. 1C illustrates a top view of a spiral track writer system with a hard disk drive positioned over a pushpin assembly and a pushpin arm, in accordance with various aspects of the subject technology.

FIG. 1C illustrates a top view of spiral track writer system 20 with hard disk drive 12 positioned over pushpin assembly 10 and pushpin arm 14, in accordance with various aspects of the subject technology. As shown, the pushpin of pushpin assembly 10 extends through slot 58 of hard disk drive 12 to engage the actuator arm of the headstack assembly (not shown). By actuating pushpin arm 14, and hence pushpin assembly 10, the pushpin of pushpin assembly 10 may be moved along slot 58 to guide the actuator arm of the headstack assembly to write desired spiral tracks onto the media disk of hard disk drive 12.

Figure 1D:
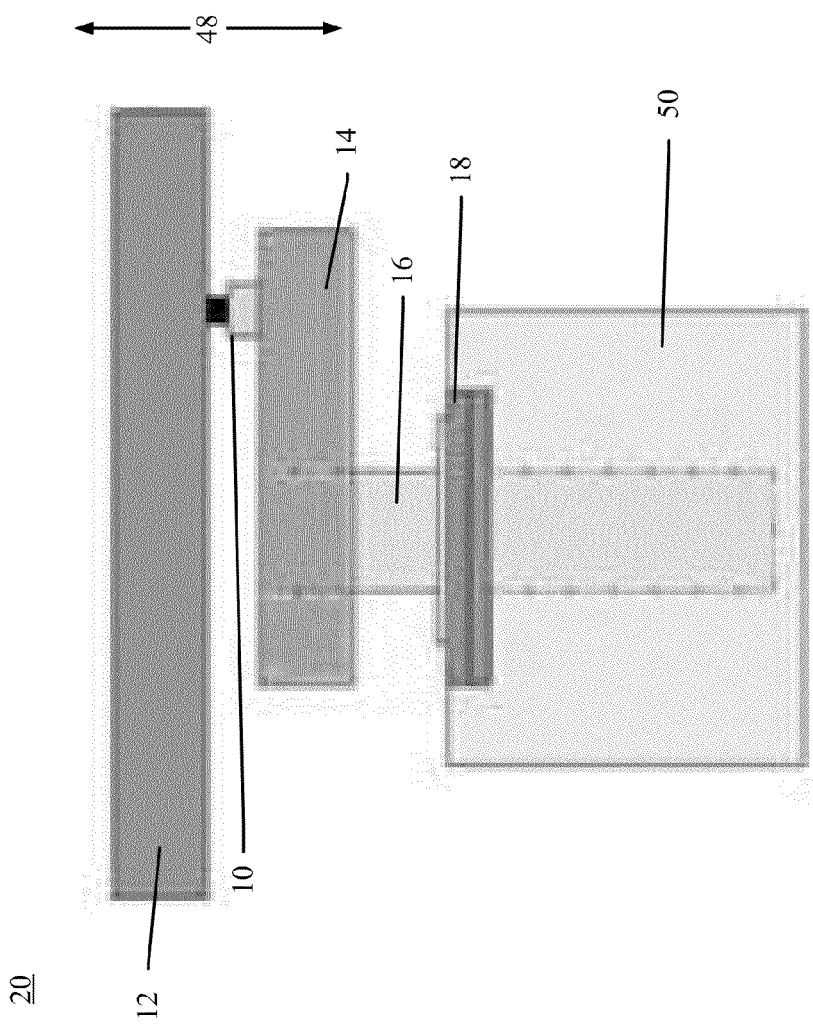
FIG. 1D illustrates a cross-sectional view of a spiral track writer system, in accordance with various aspects of the subject technology.

FIG. 1D illustrates a cross-sectional view of spiral track writer system 20, in accordance with various aspects of the subject technology. In some aspects, spiral track writer system 20 comprises bearing 18 coupling shaft 16 to actuator unit 50. Bearing 18 is configured to facilitate displacement and movement of shaft 16 relative to actuator unit 50. During the writing of the spiral tracks and/or when hard disk drive 12 is positioned over pushpin assembly 10 and pushpin arm 14, hard disk drive 12 may become misaligned with respect to pushpin assembly 10, thereby causing hard disk drive 12 to clamp down on the pushpin of pushpin assembly 10. In particular, a force from hard disk drive 12 may be exerted longitudinally (e.g., along longitudinal axis 48) on the pushpin of pushpin assembly 10. According to various aspects of the subject technology, pushpin assembly 10 is configured such that this longitudinal force is not transferred to bearing 18 via pushpin arm 14 and shaft 16. Such a force may undesirably damage bearing 18, and the repair or replacement of bearing 18 can be time consuming and expensive.

Figure 2A:
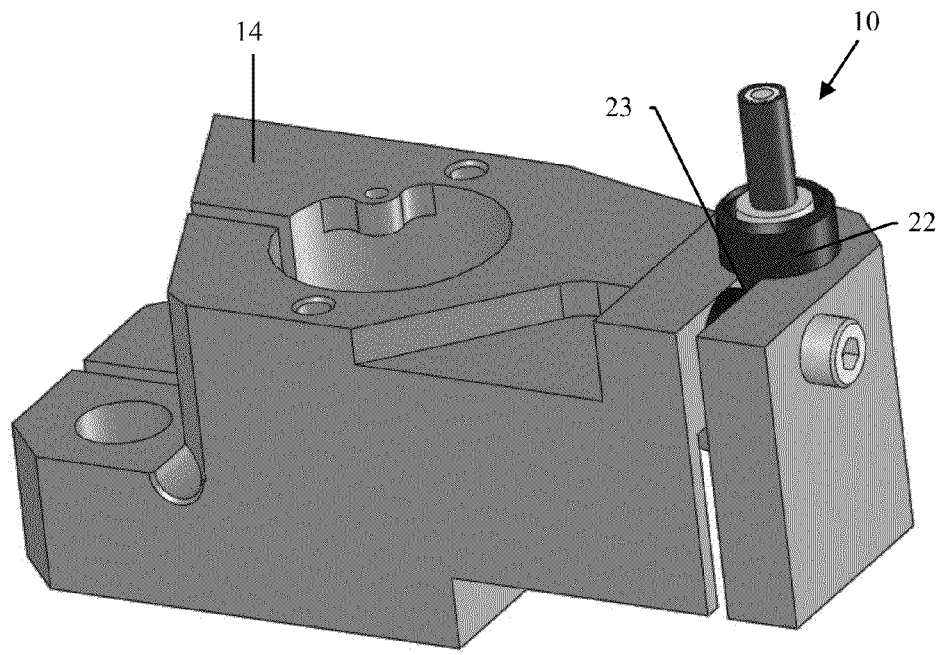
FIG. 2A illustrates a perspective view of a pushpin arm and a pushpin assembly, in accordance with various aspects of the subject technology.
Figure 2B:
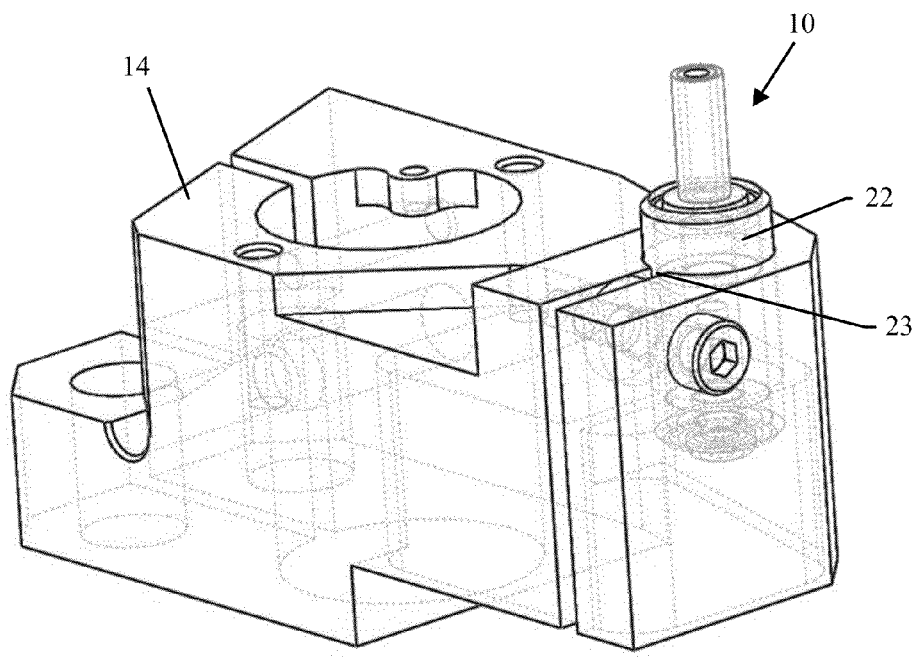
FIG. 2B illustrates a perspective view of a pushpin arm and a pushpin assembly, in accordance with various aspects of the subject technology.

FIGS. 2A and 2B illustrate perspective views of pushpin arm 14 and pushpin assembly 10, in accordance with various aspects of the subject technology. In FIG. 2B, pushpin arm 14 is drawn in a transparent manner to show a more detailed view of pushpin assembly 10 mounted on pushpin arm 14. In some aspects, pushpin assembly 10 comprises body 22 that is inserted into receptacle 23 defined in pushpin arm 14 for receiving body 22. In some aspects, body 22 is secured in receptacle 23 such that lateral movement of pushpin arm 14 results in lateral movement of pushpin assembly 10 as well.

Figure 3A:
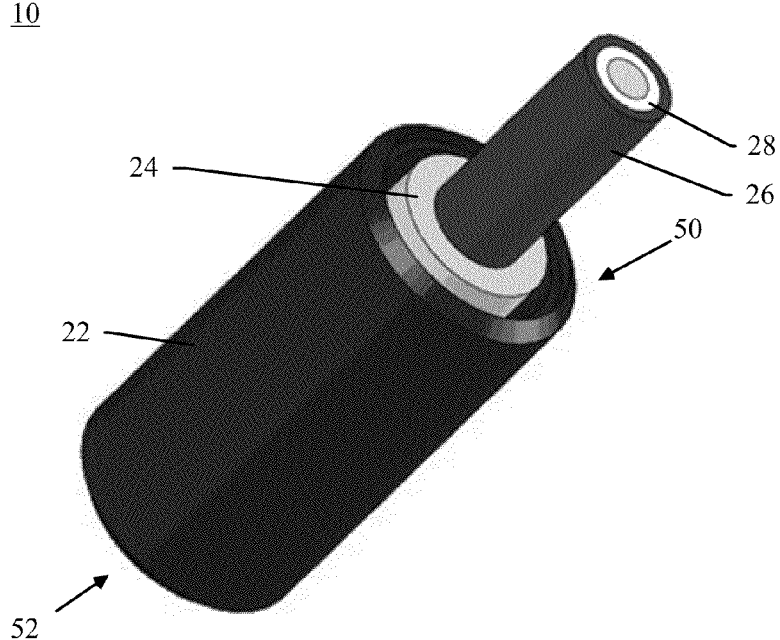
FIG. 3A illustrates a perspective view of a pushpin assembly, in accordance with various aspects of the subject technology.
Figure 3B:
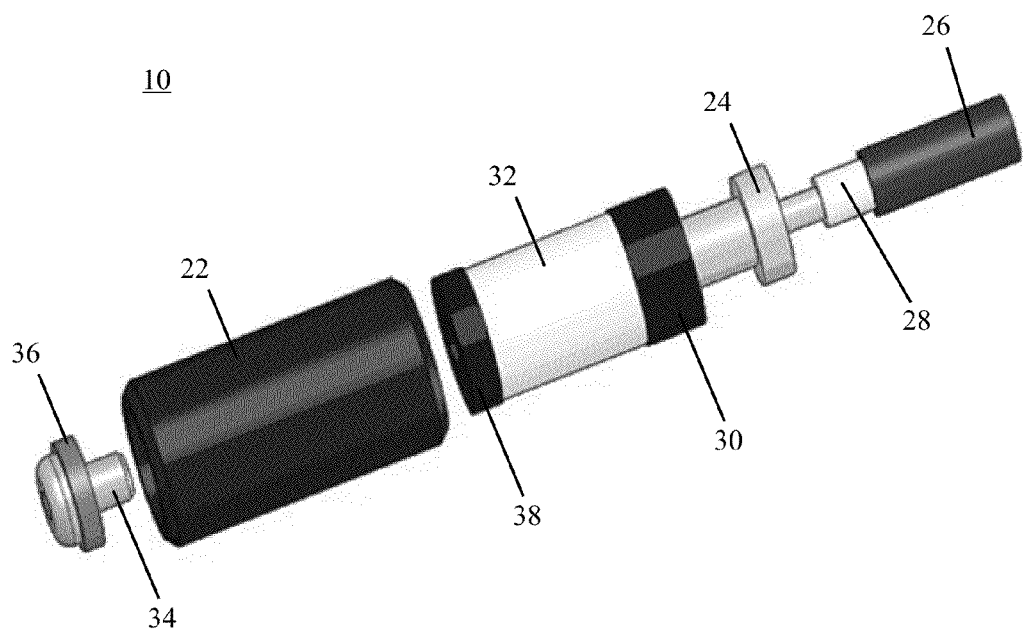
FIG. 3B illustrates an exploded view of a pushpin assembly, in accordance with various aspects of the subject technology.
Figure 4:
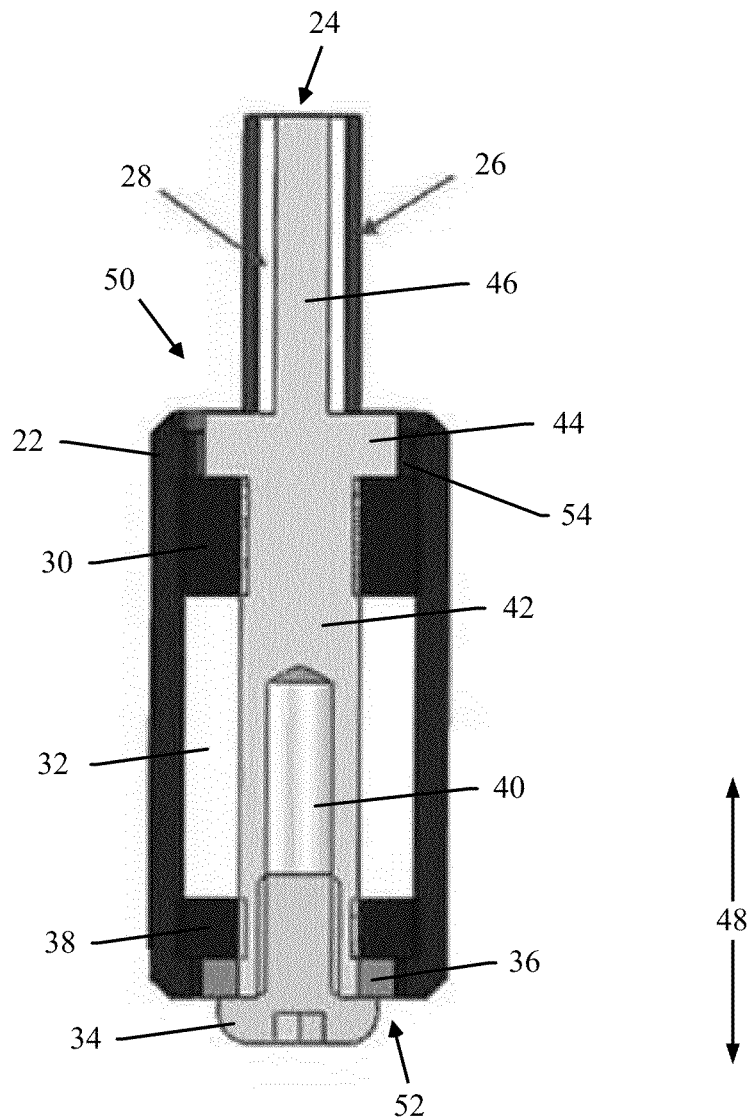
FIG. 4 also illustrates a cross-sectional view of a pushpin assembly, in accordance with various aspects of the subject technology.

FIG. 3A illustrates a perspective view of pushpin assembly 10 while FIG. 3B illustrates an exploded view of pushpin assembly 10, in accordance with various aspects of the subject technology. FIG. 4 illustrates a cross-sectional view of pushpin assembly 10, in accordance with various aspects of the subject technology. Cavity 54 is defined in body 22 and extends between first opening 50 and second opening 52. Pushpin assembly 10 also comprises bushing 32 slide fitted within cavity 54 such that an inner wall of cavity 54 surrounds bushing 32. Pushpin assembly 10 also comprises pushpin 24 having shaft portion 42 and tip portion 46. In some aspects, bushing 32 surrounds shaft portion 42. In some aspects, shaft portion 42 is friction fitted within bushing 32. Bushing 32 and shaft portion 42 are coaxially arranged within cavity 54. In some aspects, inner sleeve 28 surrounds tip portion 46 and outer sleeve 26 surrounds inner sleeve 28.

According to certain aspects, pushpin 24 comprises ledge portion 44 coupling tip portion 46 and shaft portion 42. Ledge portion 44 has a diameter greater than a diameter of tip portion 46 and a diameter of shaft portion 42. Pushpin assembly 10 comprises first damper 30 surrounding shaft portion 42 and disposed between ledge portion 44 and a first side of bushing 32. Pushpin assembly 10 also comprises second damper 38 surrounding shaft portion 42 and disposed between a second side of bushing 32 and second opening 52. In some aspects, pushpin assembly 10 comprises screw 34 configured to extend through second opening 52 and fasten into threaded hole 40 of pushpin 24. Pushpin assembly 10 comprises spacer 36 disposed between second damper 38 and a head of screw 34 fastened into threaded hole 40. In some aspects, first damper 30, bushing 32, and second damper 38 are secured between ledge portion 44 and spacer 36. Thus, first damper 30, bushing 32, and second damper 38 are held together between ledge portion 44 and spacer 36 when screw 34 is fastened into threaded hole 40.

According to various aspects of the subject technology, tip portion 46 is configured to extend through first opening 50 and engage the actuator arm of the headstack assembly of hard disk drive 12 for writing spiral tracks onto the media disk of hard disk drive 12. In some aspects, pushpin 24 comprises stainless steel or other suitable material of sufficient rigidity for engaging the actuator arm of the headstack assembly of hard disk drive 12. In some aspects, outer sleeve 26 is configured to contact the actuator arm of the headstack assembly. Outer sleeve 26 may comprise electrostatic discharge (ESD) material or other similar non-metal material. Metal-to-metal contact between pushpin 24 and the actuator arm may be undesirable as the abrasive contact between pushpin 24 and the actuator arm may generate particles that can contaminate hard disk drive 12. By having outer sleeve 26 contact the actuator arm, metal-to-metal contact may be advantageously avoided during the spiral track writing process.

In some aspects, inner sleeve 28 may provide damping characteristics to minimize jitter resulting from the contact between outer sleeve 26 and the actuator arm of the headstack assembly during the spiral track writing process. By minimizing the jitter, more accurate spiral tracks may be written. In some aspects, inner sleeve 28 may comprise polytetrafluoroethylene (PTFE), which is commonly known as Teflon, or other suitable material for providing the damping characteristics.

According to various aspects of the subject technology, first damper 30 and second damper 38 provide additional damping characteristics to minimize jitter resulting from pushpin 24 engaging the actuator arm of the headstack assembly during the spiral track writing process. For example, first damper 30 and second damper 38 may comprise at least one of ESD material, polyetherimide (PEI) (which is commonly known as Ultem), and other suitable material for providing the damping characteristics.

According to various aspects of the subject technology, if first damper 30 and/or second damper 38 become worn out due to repeated use, bushing 32 advantageously provides structural support for pushpin 24 such that pushpin 24 does not tilt or become off-centered with respect to body 22 (e.g., with respect to longitudinal axis 48). In some aspects, by friction fitting shaft portion 42 within bushing 32 (which is slide fitted within cavity 54), pushpin 24 may remain centered within body 22, thereby allowing consistent spiral tracks to be written onto the media disk of hard disk drive 12 even if first damper 30 and/or second damper 38 become worn out. For example, an outer diameter of shaft portion 42 is equal to an inner diameter of bushing 32, and a diameter of cavity 54 is equal to an outer diameter of bushing 32. Such a configuration may ensure that pushpin 24 remains centered within body 22. Although shaft portion 42 is friction fitted within bushing 32, shaft portion 42 may be fitted within bushing 32 using other suitable methods provided that pushpin 24 may remain centered within body 22. In some aspects, bushing 32 comprises PTFE or other suitable material that can provide damping characteristics as well as provide sufficient rigidity for supporting shaft portion 42.

As discussed above, hard disk drive 12 may become misaligned with respect to pushpin assembly 10 during the writing of the spiral tracks, thereby causing hard disk drive 12 to clamp down on pushpin 24 of pushpin assembly 10. In particular, a force from hard disk drive 12 may be exerted longitudinally (e.g., along longitudinal axis 48) on pushpin 24 of pushpin assembly 10. Pushpin assembly 10 may be configured such that this longitudinal force is not transferred to bearing 18 via pushpin arm 14 and shaft 16. For example, a longitudinal force greater than or equal to a predetermined threshold exerted on tip portion 46 results in bushing 32 and pushpin 24 being displaced in a longitudinal direction relative to body 22. Because bushing 32 is slide fitted within cavity 54, bushing 32 and pushpin 24 may be configured to slide with respect to body 22 such that the longitudinal force exerted on tip portion 46 displaces bushing 32 and pushpin 24 (including components attached or coupled to bushing 32 and pushpin 24 such as inner sleeve 28, outer sleeve 26, first damper 30, second damper 38, spacer 36, and screw 34) rather than the entire pushpin assembly 10 including body 22. In other words, bushing 32 and pushpin 24 may sink relative to body 22 once the longitudinal force is exerted on tip portion 46.

Figure 5A:
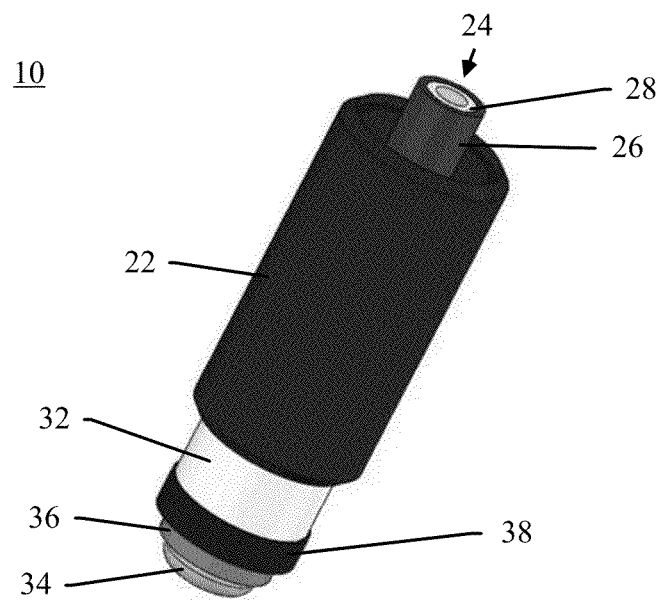
FIG. 5A illustrates a perspective view of a pushpin assembly in a sunken configuration, in accordance with various aspects of the subject technology.
Figure 5B:
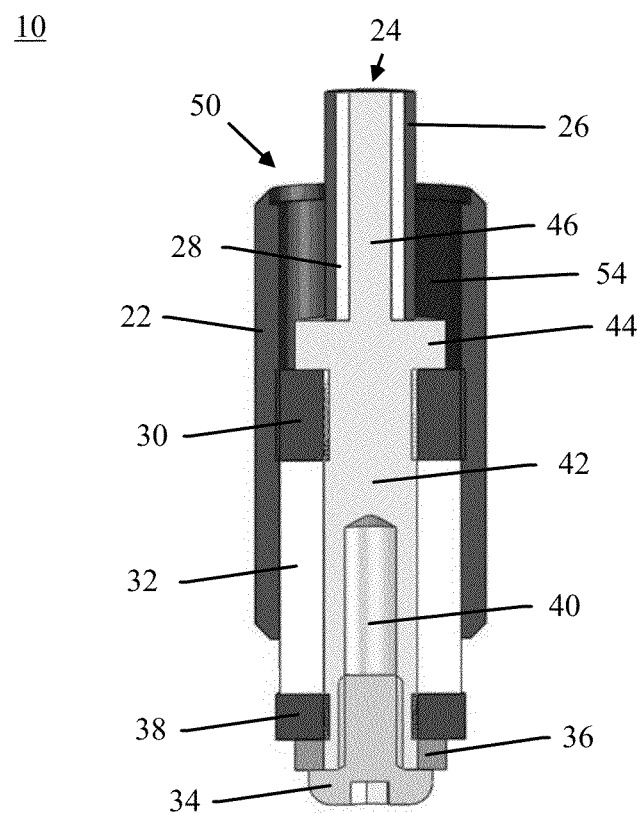
FIG. 5B illustrates a cross-sectional view of a pushpin assembly in a sunken configuration, in accordance with various aspects of the subject technology.

While FIG. 4 shows pushpin assembly 10 in an engaging configuration in which tip portion 46 extends through first opening 50 to engage the actuator arm of the headstack assembly of hard disk drive 12, FIG. 5A shows pushpin assembly 10 in a sunken configuration in which bushing 32 and pushpin 24 are displaced relative to body 22. FIG. 5B illustrates a cross-sectional view of pushpin assembly 10 in the sunken configuration, in accordance with various aspects of the subject technology. In some aspects, the predetermined threshold may be 2.5 kilogram-force. For example, bushing is slide fitted within cavity 54 such that a longitudinal force greater than or equal to 2.5 kilogram-force exerted on tip portion 46 results in bushing 32 and pushpin 24 being displaced in the longitudinal direction relative to body 22. However, the predetermined threshold may be greater than or less than 2.5 kilogram-force depending on the size of hard disk drive 12, the size of pushpin assembly 10, how tightly bushing 32 is fitted within cavity 54, etc. In some aspects, body 22 is secured within receptacle 23 (e.g., as shown in FIGS. 2A and 2B) such that body 22 does not move with respect to pushpin arm 14. Thus, bushing 32 and pushpin 24 may be displaced in the longitudinal direction relative to both body 22 and pushpin arm 14. As a result, the longitudinal force is not transferred to bearing 18 via pushpin arm 14 and shaft 16.

Figure 6:
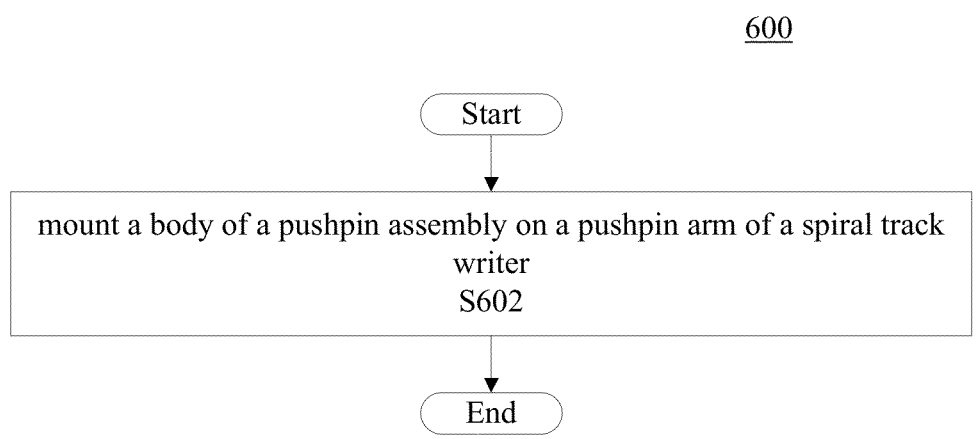
FIG. 6 illustrates a method of mounting a pushpin assembly onto a spiral track writer, in accordance with various aspects of the subject technology.

FIG. 6 illustrates method 600 of mounting a pushpin assembly onto a spiral track writer, in accordance with various aspects of the subject technology. Method 600 comprises mounting a body of a pushpin assembly on a pushpin arm of a spiral track writer (step S602). In some aspects, a cavity is defined in the body and extends between a first opening and a second opening of the body. A bushing is slide fitted within the cavity such that an inner wall of the cavity surrounds the bushing. A pushpin of the pushpin assembly comprises a shaft portion and a tip portion. The bushing surrounds the shaft portion. In some aspects, the tip portion is configured to extend through the first opening and engage an actuator arm of a headstack assembly of a hard disk drive for writing spiral tracks onto a media disk of the hard disk drive. In some aspects, a longitudinal force greater than or equal to a predetermined threshold exerted on the tip portion results in the bushing and the pushpin being displaced in a longitudinal direction relative to the body.

Although a pushpin assembly has been described herein with respect to spiral track writing, the pushpin assembly may be used with servo track writers for writing servo information.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A pushpin assembly for a spiral track writer, comprising:
   a body configured to be mounted on a pushpin arm of a spiral track writer, wherein a cavity is defined in the body and extends between a first opening and a second opening of the body;
   a bushing slide fitted within the cavity such that an inner wall of the cavity surrounds the bushing; and
   a pushpin having a shaft portion and a tip portion, wherein the bushing surrounds the shaft portion, and wherein the tip portion is configured to extend through the first opening and engage an actuator arm of a headstack assembly of a hard disk drive for writing spiral tracks onto a media disk of the hard disk drive,
   wherein a longitudinal force greater than or equal to a predetermined threshold exerted on the tip portion results in the bushing and the pushpin being displaced in a longitudinal direction relative to the body.

2. The pushpin assembly of claim 1, wherein the bushing and the shaft portion are coaxially arranged within the cavity.

3. The pushpin assembly of claim 1, further comprising:
   an inner sleeve surrounding the tip portion of the pushpin; and an outer sleeve surrounding the inner sleeve, the outer sleeve configured to contact the actuator arm of the headstack assembly.

4. The pushpin assembly of claim 3, wherein the outer sleeve comprises electrostatic discharge (ESD) material.

5. The pushpin assembly of claim 3, wherein the inner sleeve comprises polytetrafluoroethylene (PTFE).

6. The pushpin assembly of claim 1, wherein the pushpin comprises stainless steel.

7. The pushpin assembly of claim 1, further comprising a first damper surrounding the shaft portion of the pushpin and disposed between a ledge portion of the pushpin and a first side of the bushing.

8. The pushpin assembly of claim 7, further comprising a second damper surrounding the shaft portion of the pushpin and disposed between a second side of the bushing and the second opening.

9. The pushpin assembly of claim of claim 8, wherein the first damper and the second damper comprise at least one of electrostatic discharge (ESD) material and polyetherimide (PEI).

10. The pushpin assembly of claim 8, further comprising:
a screw configured to extend through the second opening and fasten into a threaded hole of the pushpin; and
a spacer disposed between the second damper and a head of the screw fastened into the threaded hole of the pushpin,
wherein the first damper, the bushing, and the second damper are secured between the ledge portion and the spacer disposed between the second damper and the head of the screw fastened into the threaded hole of the pushpin.

11. The pushpin assembly of claim 1, wherein the bushing comprises polytetrafluoroethylene (PTFE).

12. The pushpin assembly of claim 1, wherein the predetermined threshold is 2.5 kilogram-force.

13. The pushpin assembly of claim 1, wherein the shaft portion is friction fitted within the bushing.

14. The pushpin assembly of claim 1, wherein a diameter of the cavity is equal to an outer diameter of the bushing.

15. The pushpin assembly of claim 1, wherein an outer diameter of the shaft portion is equal to an inner diameter of the bushing.

16. The pushpin assembly of claim 1, wherein the pushpin comprises a ledge portion coupling the tip portion and the shaft portion, the ledge portion having a diameter greater than a diameter of the tip portion and a diameter of the shaft portion.

17. A spiral track writer system comprising:
an actuator unit;
a shaft attached to the actuator unit;
a pushpin arm mounted on the shaft, wherein the actuator unit is configured to actuate the pushpin arm using the shaft; and
a pushpin assembly comprising:
a body mounted on the pushpin arm, wherein a cavity is defined in the body and extends between a first opening and a second opening of the body;
a bushing slide fitted within the cavity such that an inner wall of the cavity surrounds the bushing; and
a pushpin having a shaft portion and a tip portion, wherein the bushing surrounds the shaft portion, and wherein the tip portion is configured to extend through the first opening and engage an actuator arm of a headstack assembly of a hard disk drive for writing spiral tracks onto a media disk of the hard disk drive when the pushpin arm is actuated,
wherein a longitudinal force greater than or equal to a predetermined threshold exerted on the tip portion results in the bushing and the pushpin being displaced in a longitudinal direction relative to the body.

18. The system of claim 17, wherein the longitudinal force greater than or equal to the predetermined threshold exerted on the tip portion results in the bushing and the pushpin being displaced in the longitudinal direction relative to the pushpin arm.

19. The system of claim 17, further comprising a bearing coupling the shaft to the actuator unit, the bearing configured to facilitate displacement and movement of the shaft relative to the actuator unit.

20. A method of mounting a pushpin assembly onto a spiral track writer, the method comprising:
mounting a body of a pushpin assembly on a pushpin arm of a spiral track writer, wherein a cavity is defined in the body and extends between a first opening and a second opening of the body, wherein a bushing is slide fitted within the cavity such that an inner wall of the cavity surrounds the bushing, wherein a pushpin of the pushpin assembly comprises a shaft portion and a tip portion, wherein the bushing surrounds the shaft portion, wherein the tip portion is configured to extend through the first opening and engage an actuator arm of a headstack assembly of a hard disk drive for writing spiral tracks onto a media disk of the hard disk drive, and wherein a longitudinal force greater than or equal to a predetermined threshold exerted on the tip portion results in the bushing and the pushpin being displaced in a longitudinal direction relative to the body.

* * * * *